3,051,547
PRODUCTION OF POTASSIUM FLUOTANTALATE FROM TANTALUM ORE AND THE LIKE

Edwin J. Bielecki, Boyertown, Pa., assignor to Kawecki Chemical Company, Boyertown, Pa., a corporation of Pennsylvania
No Drawing. Filed Oct. 27, 1960, Ser. No. 65,300
4 Claims. (Cl. 23—19)

This invention relates to the production of potassium fluotantalate from tantalum ores and the like and, more particularly, to a method wherein the tantalum, in the form in which it is separated from the omnipresent columbium, can be directly converted to high purity potassium fluotantalate.

Columbium and tantalum occur in nature in the oxidic condition in admixture with one another in varying proportions. The chemical similarity of the two elements contributes to the difficulty in recovering either of the elements free from the other element. But even more demanding on recovery methods is the requirement in the case of elemental tantalum of a degree of purity typical of other elements useful in electronic devices.

I have now devised a novel method of recovering the tantalum component of its ores or of tantalum-containing concentrates and residues in the form of a high-purity salt which can be readily converted to high-purity elemental tantalum. The novel procedure of this invention involves the use of certain ore extractants, resin adsorbents and eluants therefor which make possible the recovery of the tantalum component of the ore in a form which can be directly converted to high purity potassium fluotantalate.

The method of my invention comprises digesting the ore in a concentrated hydrofluoric acid-containing solution, separating from the ore residue the resulting columbium- and tantalum-containing liquor and adding to this liquor any water, hydrofluoric acid and hydrochloric acid required to adjust its total columbium and tantalum content (calculated as oxides) to not more than about 1.2 pounds per gallon, its fluoride content to about 5 to 20% by weight and its chloride content to about 1.5 to 25% by weight. The resulting liquor is then passed in contact with an anion-exchange resin to remove from the liquor its columbium and tantalum components, and the resin is thereafter flushed with an aqueous hydrofluoric acid solution to remove any entrained liquor as well as any impurity, such as silicon, adsorbed by the resin. The adsorbed columbium content of the resin is then selectively stripped from the resin by eluting it with an aqueous solution of ammonium chloride acidified with hydrofluoric acid. The adsorbed tantalum content of the resin is thereafter stripped from the resin with an eluant consisting of an aqueous solution of ammonium fluoride and ammonium chloride. The tantalum stripping is effected by progressively eluting the resin with a quantity of the eluant not in excess of that which will yield a solution containing at least 15 grams per liter of dissolved tantalum (calculated as oxide). To this solution there is added a stoichiometric excess of potassium chloride and an amount of hydrochloric acid sufficient to provide a strongly acidic solution of potassium fluotantalate, and the potassium fluotanatalate is thereafter crystallized from this solution.

The method of my invention is applicable to the recovery of tantalum as potassium fluotantalate from the poorest to the richest ores, concentrates and residues (all included hereinafer in the term "ore"), regardless of whether they are low in columbium and high in tantalum (i.e. "tantalite" ores) or are high in columbium and low in tantalum (i.e. "columbite" ores).

The ore is extracted by a conventional treatment with hydrofluoric acid. Ordinary concentrated hydrofluoric acid (70% HF) is preferred for this purpose although weaker and stronger grades of acid are useful. The hydrofluoric acid extractant may be supplemented by the addition of hydrochloric acid, preferably of concentrated technical grade (20° Bé). If hydrofluoric acid and hydrochloric acid are both used, they are advantageously, but not necessarily, used in such amount as to provide the required fluoride and chloride content in the columbium- and tantalum-containing extraction liquor.

This acidic extracting medium is heated, advantageously to at least 70° to 75° C., with live steam and then the ore is added incrementally, additional amounts of steam being added when necessary to maintain the aforementioned elevated temperature. Digestion of the ore is continued under these conditions until the extraction of the tantalum component (along with at least a portion of the columbium component) of the ore is effectively completed. The extraction liquor is then separated from the ore residue by filtration, decantation or the like and contains all hydrofluoric acid-soluble components of the ore including its columbium and tantalum content.

The total amount of columbium and tantalum (calculated as $Cb_2O_5$ and $Ta_2O_5$) in the extraction liquor is then adjusted, either by evaporation or by the addition of water, to a value not exceeding about 1.2 pounds per gallon. There is no significant lower limit to the amount of columbium and tantalum which the liquor may contain, a relatively high concentration up to the aforesaid limit being presently preferred for economic reasons. The fluoride ($F^-$) content of the liquor is also adjusted by the aforesaid addition of water or evaporation, or by the addition of more hydrofluoric acid as the case may require, to about 5 to 20% (and preferably 8 to 15%) by weight of the liquor. The chloride ($Cl^-$) content of the liquor must also be adjusted to about 1.5 to 25% (and preferably 2 to 10%) by weight of the liquor, either by the hydrochloric acid added to the hydrofluoric acid for the ore-extraction step or by the addition of hydrochloric acid at this stage of the operation, or by both. The resulting liquor having columbium, tantalum, fluoride and chloride contents within the aforementioned ranges is characterized by the ability to relinquish its columbium and tantalum contents to an anion-exchange resin while all other components of the core in the extraction liquor, with the exception of a small proportion of its silicon content, are generally not adsorbed and pass through the bed.

The thus-adjusted extraction liquor is then passed in contact with an anion-exchange resin having from 2 to 16 cross-linkages, and preferably having from 4 to 8 cross-linkages. Dow Chemical Company's "Dowex-1" and Rohm & Haas' "IRA-400" are representative of these resins useful in practicing the present invention. In general, I prefer to use these resins in a particle size of 20 to 50 mesh (Tyler Standard screen), although somewhat smaller and larger particle sizes can be used effectively. The volume of resin, whether in the form of a bed or column or suspended in the liquor, should be sufficient to accommodate the adsorption of the entire columbium and tantalum content of the extraction liquid together with the small amount of other components of the liquor which are initially adsorbed by the resin. I have found that an amount of at least 14 cubic feet of resin per 100 pounds of columbium and tantalum (calculated as oxides) in the liquor is presently preferred for efficient operation pursuant to the invention, but a lesser amount can be used effectively.

The entrained liquor is then flushed from the resin, which, for the purpose of discussion, will be referred to hereinafter as a bed. At the same time, the small amount of impurities such as silicon (and sometimes some iron) which are initially absorbed by the resin can be selectively removed by using as the flushing medium an acid solution composed principally of hydrofluoric acid either with or without hydrochloric acid. A flushing medium having the same fluoride and chloride content as that of the adjusted extraction liquid has been found to be particularly effective in removing the entrained liquor and initially adsorbed impurities (i.e. metallic elements other than columbium and tantalum) from the resin bed.

The flushed resin bed thus contains virtually only the adsorbed columbium and tantalum components of the ore-extraction liquor. These two components can be selectively and separately stripped from the resin by proper choice and order of use of a columbium eluant and a tantalum eluant. The columbium component is stripped first from the resin bed so that only the substantially pure tantalum component remains for stripping from the resin.

The columbium eluant is composed essentially of about 1 to 5% (and preferably about 2%) by weight of HF (in the form of hydrofluoric acid) and about 100 to 175 (preferably about 140) grams per liter of ammonium chloride. The columbium eluant (which generally has a pH of about 1 to 2) may be used at any temperature ranging from ambient temperature to about 80° C. The eluant is particularly effective at temperatures of about 50° to 60° C.

The columbium eluant is passed through the resin bed in amount equal to about 60 to 100% (and preferably about 75%) of that amount of the eluant required to elute all of the columbium from the resin. The resulting effluent with its contained columbium is withdrawn from the bed for subsequent treatment to recover the columbium in useful form by any conventional process. For example, the columbium can be precipitated from this solution by adding gaseous ammonia; the resulting supernatant liquor can then be regenerated as a columbium or tantalum eluant by adjusting its various components pursuant to the prescriptions therefor. The remainder of the columbium in the resin bed is subsequently eluted with another portion of eluant, and the resulting liquor is recycled as the first-mentioned eluant in the initial columbium-stripping step for recovering columbium from another batch of ore-extraction liquor. The aforesaid remainder of columbium in the bed is removed with sufficient fresh eluant for this purpose.

The thus-treated resin bed now contains only the tantalum component of the original ore-extraction liquor. This tantalum is stripped from the resin with an eluant composed essentially of about 1 to 8% (and preferably about 4%) by weight of ammonium fluoride and about 100 to 250 (and preferably about 210) grams per liter of ammonium chloride. The temperature range in which this eluant is useful is the same as that for the columbium eluant. The tantalum eluant (which has a pH of about 5 to 6) is passed through the resin bed, again in a limited amount in order to obtain a tantalum-containing solution from which an alkali metal fluotantalate can be produced and separated. At first, the pH of the effluent from the bed is substantially that of the columbium eluant (about 0.5 to 2), but as the tantalum eluant displaces the columbium eluant and elutes the tantalum the pH of the bed effluent rises. It has been found in practice that an effluent pH of about 4.5 corresponds to the use of such an amount of the tantalum eluant as will yield a bed effluent having an appropriate tantalum content for directly producing with efficiency and economy a recoverable potassium fluotantalate, i.e. a tantalum content (calculated as $Ta_2O_5$) of at least 15, and preferably at least 20, grams per liter. This amount of tantalum eluant is about 40 to 75% (and preferably about 45 to 55%) of that amount required to elute all of the tantalum absorbed in the resin. The resulting tantalum-containing effluent under the aforementioned conditions has a tantalum content (calculated as $Ta_2O_5$) of about 15 to 35 grams per liter and is withdrawn and held for treatment to recover its tantalum content. The resin bed is then eluted with more of the eluant, and the resulting tantalum-containing effluent is used as the initial tantalum eluant in the next use of the resin bed in treating another batch of ore-extraction liquor.

The tantalum content of the tantalum-containing effluent from the initial tantalum stripping of the resin is then converted directly to potassium fluotantalate. This is achieved by adding a stoichiometric excess of potassium chloride (for example 1.5 to 2 times the stoichiometric amount) to the tantalum-containing effluent and by acidifying the resulting solution with concentrated hydrochloric acid (20° Bé.) in amount of about 2 to 8 (and preferably about 4) gallons per 100 gallons of the tantalum-containing effluent, or by acidifying with an amount of hydrofluoric acid, or other compatible acid, stoichiometrically equivalent to this amount of hydrochloric acid. The mixture is heated to insure complete dissolution of the potassium fluotantalate ($K_2TaF_7$) which is formed, and then the solution is allowed to cool. This causes crystallization of the potassium fluotantalate from the solution, and the crystalline product is recovered by decantation or filtering. The resulting potassium fluotantalate is virtually free of all other elements and can be converted into other high purity tantalum compounds or tantalum metal by conventional processes.

Any residual tantalum-containing effluent in the column is recovered by flushing it, advantageously with a mixture of one volume of concentrated hydrochloric acid (20° Bé.), either with or without hydrofluoric acid, although the more concentrated flush used before the columbium elution step may also be used. The resin bed is then ready for re-use.

The following specific example is illustrative of the practice of the invention:

A total of 800 grams of a tantalite-columbite type ore, containing 274 grams of $Ta_2O_5$ and 323 grams of $Cb_2O_5$, was digested with about 1,275 grams of 70% HF and about 1,070 grams of technical grade 20° Bé. HCl. The HF and HCl were first mixed together and heated to about 70–75° C., and the ore was added incrementally with intermittent injection of steam to aid the reaction. After all of the ore was added, further digestion was contained for about ½ to 1 hour until digestion was complete. The resulting reaction solution was filtered and the residue was washed with water. The filtrate and wash solution were combined and were then diluted to about four times the total volume of the HF—HCl digestion reactant.

The resulting columbium- and tantalum-containing liquor was then passed through a 3 inch diameter column consisting of about 325 cubic inches of Rohm & Haas' "IRA-400" anion-exchange resin having a particle size range of 20 to 50 mesh converted to the chloride form. The ore-textraction liquor was fed to the bed at a rate of about 8 liters per hour.

After the feed had been passed through the resin bed, a flush composed of 4.88 liters of water, 0.72 liter of technical HCl (20° Bé.) and 0.40 liter of 70% HF was added, first as a 2-liter portion, and then the remaining portion was added. The effluent was discarded as waste.

A columbium eluant, composed of about 2% by weight of HF and 140 grams per liter of ammonium chloride in water, was preheated to about 60° C. and was passed through the resin bed. The initial eluant, comprising about one-quarter of the total columbium eluant, was recycled columbium-poor effluent from the previous run. The subsequent columbium eluant was freshly made up and equalled about three times the volume of the initial eluant. The total volume of the columbium eluant was 20.8 liters.

The tantalum eluant was then added after the columbium had been removed from the bed. This eluant was added in the same manner as the columbium eluant but differed in composition in that it was composed of about 4% by weight of ammonium fluoride and about 210 grams per liter of ammonium chloride in water solution. The temperature of the tantalum eluant was about 70° C.

At the end of the columbium elution of the resin from the column and at the beginning of the tantalum elution, there was an overlap of columbium and tantalum eluant concentrations in the effluent. This portion of the effluent was collected and its tantalum and columbium values were separately recovered by resin adsorption. Of the total of 20 liters of tantalum eluant used, 9.7 were used initially in arriving at the point of cut-off at which the pH of the tantalum effluent rose to 4.5. The remaining tantalum eluant was passed through the bed and this effluent was used as the initial eluant for the tantalum elution in the next cycle.

After the tantalum had been stripped from the column, the column was acidified with a hydrochloric acid-water wash consisting of 1 liter of technical HCl and 5 liters of water. The resin column was then ready for the next cycle.

The first-mentioned tantalum-containing effluent fraction having a volume of 9.7 liters was converted to $K_2TaF_7$ by adding about 465 grams of technical HCl and 380 grams of KCl. The resulting solution was heated with live steam until all of the thus-formed $K_2TaF_7$ was dissolved. This solution was allowed to cool to 16° C. without agitation in order to crystallize the $K_2TaF_7$. The $K_2TaF_7$ product was filtered, washed with a minimum amount of de-ionized water and was dried. The yield of potassium fluotantalate (423 grams) on the basis of the $Ta_2O_5$ content of the ore was about 90%. The yield on the basis of the tantalum present in the first-mentioned tantalum-containing effluent from the column was about 96% with only about 4% of the potassium fluotantalate remaining in the mother liquor from which it was recovered by adding gaseous ammonia to precipitate the tantalum. This product was recovered by combining it with other similar products from other cycles and by dissolving it in hydrofluoric acid, then adding water and potassium chloride as needed to form a $K_2TaF_7$ product.

The columbium-containing fraction was recovered by adding gaseous ammonia to the columbium eluant until a pH of approximately 9 was obtained. The resulting precipitate was settled, the supernatant liquor was decanted and regenerated to tantalum or columbium eluant composition, and the columbium-containing product was recovered.

I claim:

1. In the extraction of the tantalum and columbium contents of a tantalum ore in which the ore is digested in a concentrated hydrofluoric acid-containing solution, the resulting columbium- and tantalum-containing liquor is separated from the ore residue, the total columbium and tantalum content of the liquor (calculated as oxides) is adjusted by the addition of water if necessary to not more than about 1.2 pounds per gallon and its fluoride content is adjusted to about 5 to 20% by weight, the adjusted liquor is passed in contact with an anion-exchange resin capable of removing from the liquor its columbium and tantalum components, the thus-adsorbed columbium is selectively stripped from the resin by eluting it with an aqueous soultion of ammonium chloride acidified with hydrofluoric acid, and thereafter the adsorbed tantalum is stripped from the resin by eluting it with an aqueous solution of ammonium fluoride and ammonium chloride, the improvement which comprises recovering the adsorbed tantalum component in a state capable of being directly converted to potassium fluotantalate by (a) incorporating hydrochloric acid in the digestion liquor in amount such that when the columbium, tantalum and fluoride contents of the liquor are adjusted as aforesaid its chloride content is about 1.5 to 25% by weight, (b) effecting the elution of the adsorbed tantalum from the resin with a quantity of said acidified ammonium chloride eluant not in excess of that which will yield a solution composed essentially of the eluant containing at least 15 grams per liter of dissolved tantalum (calculated as oxide), (c) adding to the resulting tantalum-containing solution a stoichiometric excess of potassium chloride and an amount of acid sufficient to provide a strongly acidic solution of potassium fluotantalate, and (d) crystallizing the potassium fluotantalate from said solution thereof.

2. The method according to claim 1 in which the hydrochloric acid is added to the hydrofluoric acid for the ore-digestion operation.

3. The method according to claim 1 in which the tantalum-containing solution is obtained by collecting from the resin only that amount of effluent which has a pH not in excess of 4.5.

4. The method according to claim 1 in which the hydrochloric acid is added to the hydrofluoric acid for the ore-digestion operation and in which the tantalum-containing solution is obtained by collecting from the resin only that amount of effluent which has a pH not in excess of 4.5.

References Cited in the file of this patent

UNITED STATES PATENTS

| | | |
|---|---|---|
| 1,802,242 | Fink et al. | Apr. 21, 1931 |
| 2,962,372 | Foos et al. | Nov. 29, 1960 |

OTHER REFERENCES

Miller, G. L.: "Metallurgy of the Rarer Metals—6: Tantalum and Niobium," Academic Press Inc., N.Y., 1959, pages 129–133 and 71–73.

Kraus et al.: "Journal of the American Chemical Society," vol. 71, November 1949, page 3855.

Kraus et al.: "Journal of the American Chemical Society," vol. 73, 1951, pages 9–15, and 2900–2902.

UNITED STATES PATENT OFFICE
CERTIFICATE OF CORRECTION

Patent No. 3,051,547                      August 28, 1962

Edwin J. Bielecki

It is hereby certified that error appears in the above numbered patent requiring correction and that the said Letters Patent should read as corrected below.

Column 1, line 63, for "fluotanatalate" read -- fluotantalate --; column 2, line 45, for "core" read -- ore --; same column 2, line 60, and column 3, line 5, for "liquid", each occurrence, read -- liquor --; column 4, line 42, for "contained" read -- continued --; line 53, for "ore-textraction" read -- ore-extraction --; column 5, line 9, after "9.7" insert -- liters --.

Signed and sealed this 8th day of January 1963.

(SEAL)
Attest:

ERNEST W. SWIDER                      DAVID L. LADD
Attesting Officer                      Commissioner of Patents